(No Model.)
E. THOMSON.
ELECTRIC METER.
No. 508,661. Patented Nov. 14, 1893.
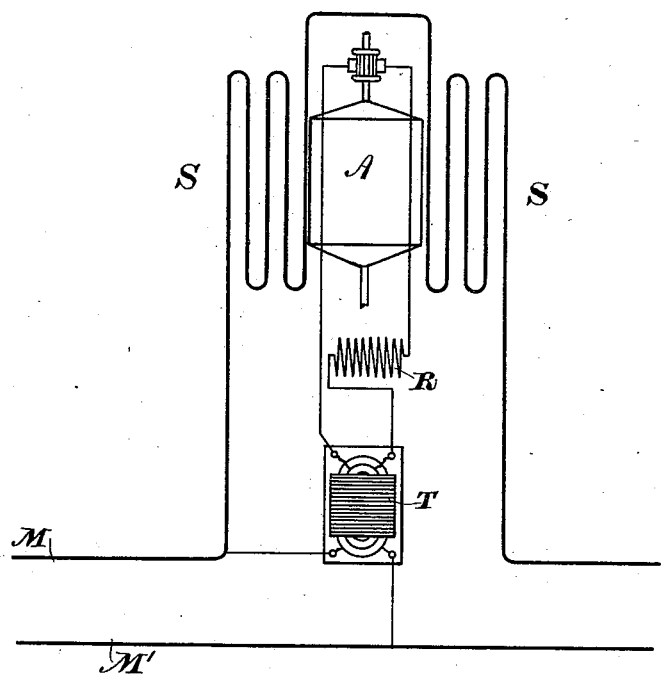
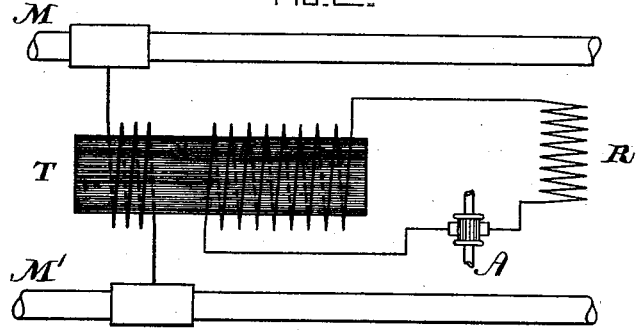
WITNESSES
Alec F. Macdonald.
J. J. Johnston.
INVENTOR
Elihu Thomson
by Bentley and Blodgett
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ELECTRIC METER.

SPECIFICATION forming part of Letters Patent No. 508,661, dated November 14, 1893.

Application filed May 12, 1893. Serial No. 473,947. (No model.)

*To all whom it may concern:*

Be it known that I, ELIHU THOMSON, a citizen of the United States, residing at Swampscott, in the county of Essex and State of Massachusetts, have made certain new and useful Improvements in Electric Meters, of which the following is a specification.

My invention relates to electric meters and has for its object to deliver to the rotating parts of such meters a convenient potential which shall neither involve, on the one hand, a risk of the insulation of the parts of the apparatus, nor, on the other hand, require the armature or the commutator to be traversed by such heavy currents as would make it inconvenient to convey them to such armature or commutator without involving large friction losses. Thus my invention permits me to apply my motor-meter to register the energy being supplied by an alternating current of, say, one thousand, two thousand, five thousand or ten thousand volts, which potential would be too high for direct application to the rotating part of the meter, on account of the delicacy of the insulation of the armature coils, and of the commutator especially. To use currents of such very high potentials the armature must be wound with excessively fine wire, and where a commutator is used the segments of the commutator must be very numerous to prevent short circuiting. This would enlarge the structure and make it expensive, inconvenient, and unsatisfactory, and would, further, destroy its durability. On the other hand, where alternating currents are applied for metal working of such low potential as from two to ten volts the rotating part of the meter would receive a comparatively large current in shunt to the work which would involve the use of large conducting surfaces on the rotating part, such as a large commutator, and this would in turn result in excessive friction, a thing to be carefully avoided.

For subserving the object of my invention I employ a transformer, suitably constructed, the primary of which is in shunt to the mains, or in shunt to the work, and, therefore, responds to the variations of the potential in the work circuit, in which primary circuit there may be, or may not be, a resistance. The secondary of such transformer is wound on local circuit with the armature or rotating part of the meter, and its winding is selected to give just that potential which will be convenient for operation, neither so high as to involve risk of burning the insulation, or involve the use of too fine a wire on the rotating part, nor, on the other hand, so low as to involve the passage of a large current thereto. The secondary may be made to deliver a moderate potential such as would give between the armature terminals a potential of, say, eight to twelve volts, or thereabout, and a "dead" resistance may be inserted into the circuit of the secondary, or armature circuit, whereby such potential may be controlled, and, at the same time, an absolute separation of the rotating part, or armature, of the meter is thus obtained from the work circuit. The preferred resistance is, as indicated above, a "dead," or non-inductive resistance which will not alter the magnetic field in which the armature revolves; but I may locate such resistance at a distance, in which case it may or may not be inductive; in any case I prefer a somewhat high resistance, say from three to twenty times that of the armature itself. The current in the work circuit is made to pass through a series connected coil which coil is diposed to affect the armature of the watt meter in the ordinary way by producing a magnetic field in which said armature turns. As is customary in meter-motors, both the field-magnet and armature coils are wound without iron cores.

In the accompanying drawings, Figure 1 is a diagrammatic illustration of my invention. Fig. 2 is a modification, adapted to large currents of low potential, more fully described hereinafter.

In the drawings, A is the armature of the meter supported in the usual way (not illustrated). S S are the field magnet coils which, as shown, are in series to the mains M M'.

T is the transformer to which I have referred the primary of which is connected in shunt to the mains and delivers a secondary or induced current to the armature A. It will be seen that the primary of the transformer is in shunt to the mains, while its secondary delivers the current to the armature at a potential which enables me, in case of high potential mains, to use less insulation than would otherwise be necessary and also enables me to use larger and less expensive wire for the winding.

R is a resistance which may or may not be employed to reduce the amount of current delivered to the armature, and which is preferably selected to be of such an amount as will, with a suitable winding upon the armature, give a difference of potential of from eight to ten volts, or thereabout, between the brushes conveying current to and leading from the commutator respectively.

By the construction illustrated I avoid the danger of burning out the armature, which is incident to connecting it directly in shunt between the mains; and as above pointed out, I diminish its weight and necessity for extreme care in its insulation, and I am also enabled to reduce the friction losses to a minimum.

When the potential between the mains is so low as to require the delivery of a large current to the armature the transformer T transforms up instead of down, securing at all times a convenient and proper potential for the rotating armature. Thus in Fig. 2 the potential between the mains M and M' might be two or three volts, or less, in which case the transformer T would have its primary winding made of a very heavy wire and the secondary winding would be of a finer wire, such a winding being selected as would, with a suitably proportioned resistance, R, give a potential of about eight to twelve volts between the brushes of the armature A. I have found that such a potential is well adapted for the purpose of avoiding the difficulties of sparking and the friction losses at the commutator brushes.

Having thus described my invention, what I claim as new, and wish to protect by Letters Patent of the United States is—

1. The combination in an electric meter, of series field coils, an armature induced thereby, and a transformer having a primary in shunt to the mains and a secondary in local circuit with the armature.

2. The combination in an electric meter, of field coils in series in the main circuit, an armature induced thereby and included in a local circuit with a secondary of a transformer the primary of which is in shunt to the main circuit, and a non-inductive resistance in the armature circuit.

3. The combination of the field coils, the armature, and the transformer, substantially as described herein, with a non-inductive resistance of greater amount than the resistance of the armature.

4. The combination in a watt meter for measuring alternating electric currents of high potential, of stationary field coils traversed directly by the current flowing in the main conductor, and a revolving armature embraced by said field coils or influenced thereby traversed by currents induced in the secondary coil of a transformer whose primary is connected in shunt across said mains.

5. In an electric meter, the combination of the field coils, the armature, the transformer, and a non-inductive resistance of from three to twenty times the armature resistance, substantially as described.

In witness whereof I have hereunto set my hand this 10th day of May, 1893.

ELIHU THOMSON.

Witnesses:
JOHN W. GIBBONEY,
BENJAMIN B. HULL.